United States Patent Office 3,440,739
Patented Apr. 29, 1969

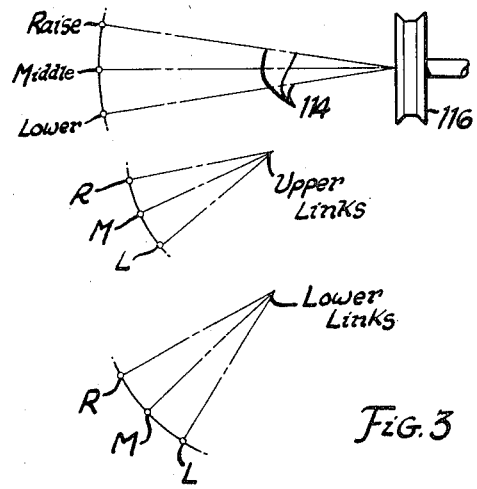
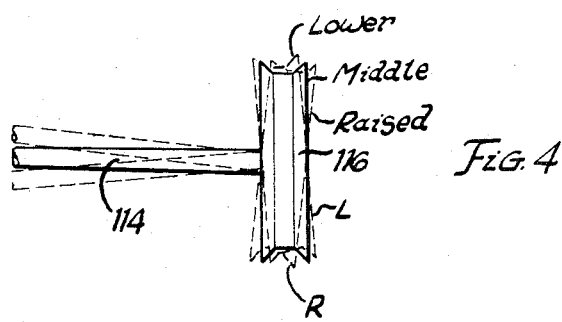
Fig. 3
Fig. 4
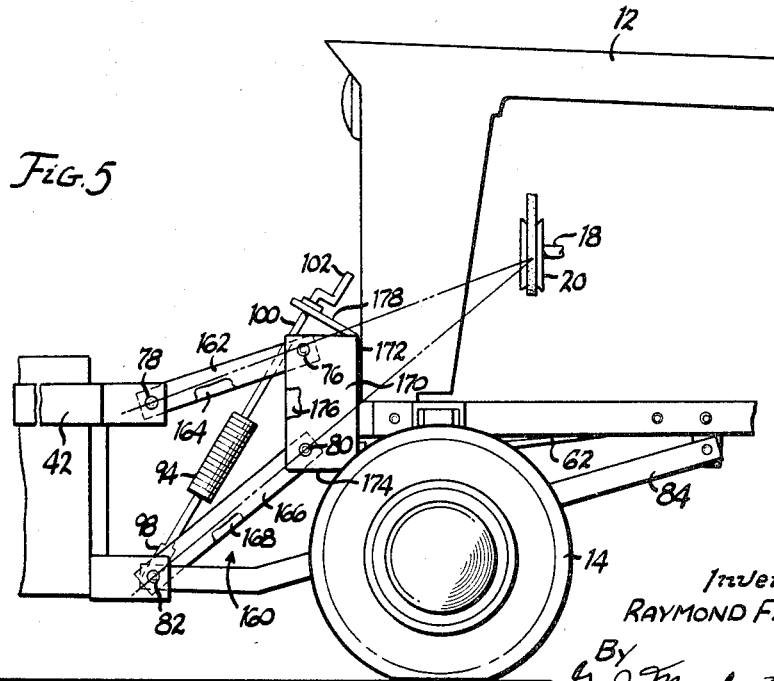
Fig. 5
Inventor.
RAYMOND F. MANKE

3,440,739
DRIVE MECHANISM
Raymond F. Manke, Racine, Wis., assignor to J. I. Case Company, Racine, Wis., a corporation of Wisconsin
Filed Oct. 15, 1965, Ser. No. 496,383
Int. Cl. E01h 5/09, 5/07
U.S. Cl. 37—43      2 Claims

ABSTRACT OF THE DISCLOSURE

A drive mechanism for engaging a powered implement or like attachment to a tractor, such that the implement is pivotal on the tractor and is powered through a drive train extending from the tractor to operate material moving means on the attachment. The pivotal connection between the tractor and the attachment is arranged so that the drive train at the point of connection between the attachment and the tractor is moved only a minimal amount when the attachment is pivoted.

---

The present invention relates to drive mechanisms for tractor-mounted implements and particularly to a drive for an attachment such as a snow blower.

Auger and impeller or blower type snow removal machines have become increasingly popular with the advent of the small garden tractors, and one of the principal requirements of the industry is to provide a simple, efficient and economical means for driving these machines. In the past, the conventional drive for a snow blower mounted on the front of a tractor required that universal joints, sliding spline shafts, or similar mechanism be used to drive the blower in order, at the same time, to be compatible with the up-and-down movement of the blower. The blower normally is operated in a lowered or near ground engaging position when removing snow, and the drive mechanism must be suitable for rotational motion without binding or twisting. When the blower is raised during operation due to an uneven ground surface, or when it is desired to take a smaller "bite," the drive mechanism must also conform to a configuration so as not to bind or twist the drive members.

The principal object of the present invention is to provide a drive mechanism which will transmit drive to an attachment having height adjustment, and which does not require universal joints, splined drive shafts or similar mechanism.

Another object is to provide a driving means for an attachment which does not bind or twist when the attachment is raised or lowered.

A further object is to provide a drive mechanism which is simple, efficient and economical to produce.

Further objects and advantages will become apparent from a reading of the following specification and the annexed drawings, in which:

FIG. 3 is a diagrammatic representation of the relationship of the several parts in the raised, middle, and lowered positions;

FIG. 4 is an enlarged diagrammatic representation of the part shown in FIG. 3, in the several positions; and FIG. 5 is a modification of a part of the structure shown in FIG. 1.

Figure 1:
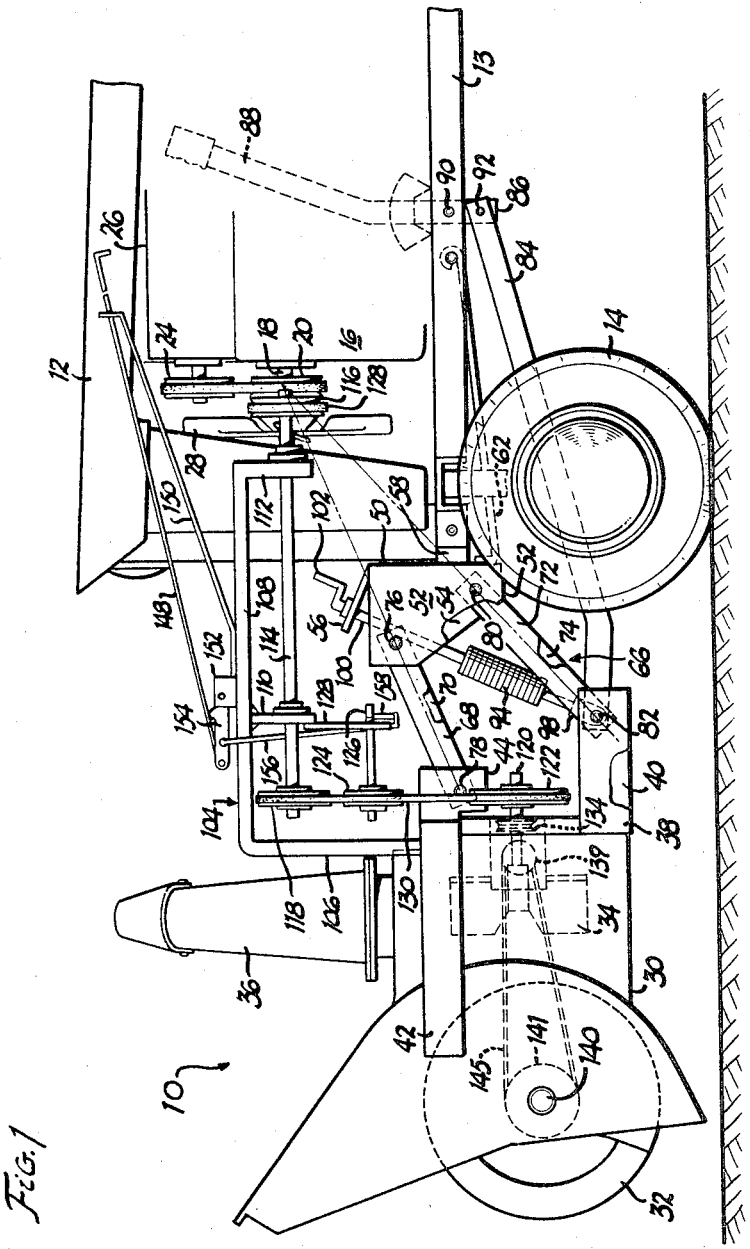
FIGURE 1 is a side elevational view of a tractor mounted implement embodying the invention.

As seen in FIG. 1, the invention is shown as a dive mechanism for an attachment, in the present instance, a snow blower 10, carried on the front of a small or garden type tractor 12. Tractor 12 could be any suitable prime mover for carrying and driving an attachment such as the snow blower shown and described, and in turn, the attachment could be any means for moving material. Tractor 12 has a frame 13 carried on traction wheels (not shown) and front wheels 14, an engine 16, a driving shaft 18, and a driving pulley 20 fixed on shaft 18 for driving a pulley 24 which, in turn, drives a generator 26. Ahead of pulley 20 and fixed on shaft 18 is a first driving sheave or pulley 21, seen in FIG. 2, and a fan 28, the fan being used for cooling purposes, and the pulley being used for purposes to be described. The tractor also includes a steering wheel, operator's station, and a transmission, which are not a part of this invention and which need not be further described.

Snow blower 10 has a frame 30 which encloses a two-way auger 32 and an impeller or blower 34. Auger 32 engages and moves the snow to the blower 34 and the blower throws the snow through a rotatable chute or pipe 36. These components of snow blower 10 are considered conventional, and it is believed that they need not be further described except as required in the disclosure of the present invention.

Figure 2:
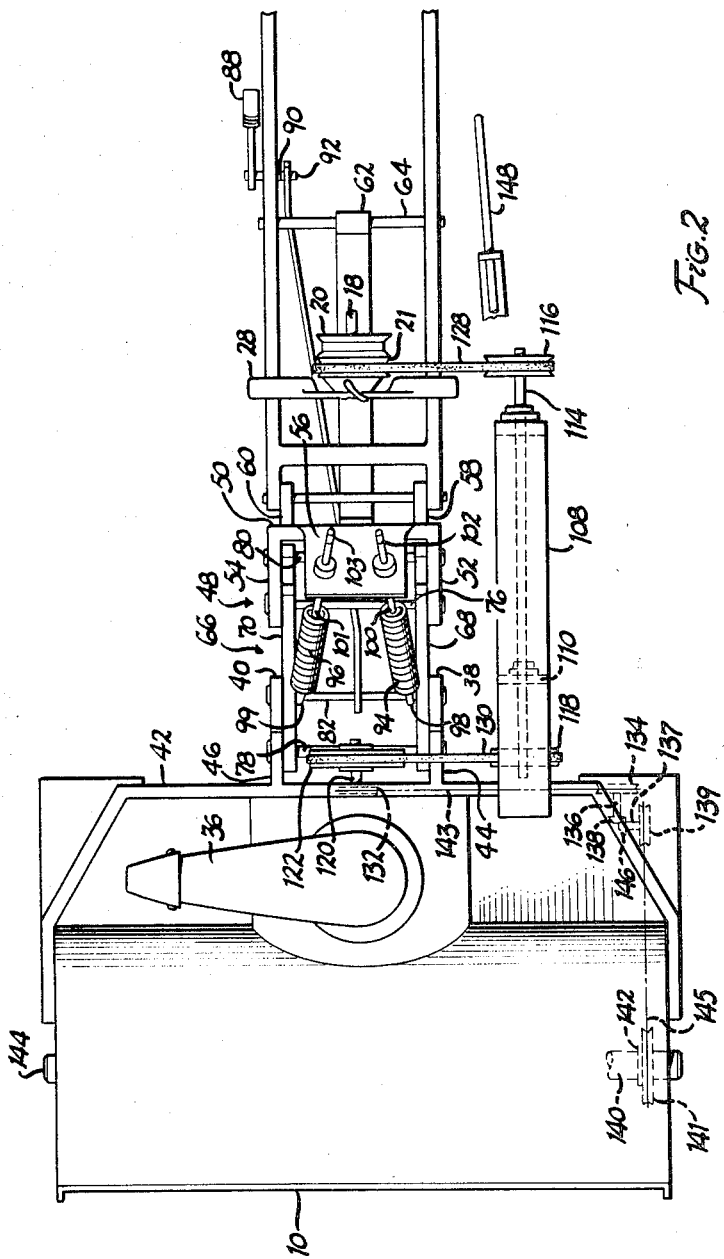
FIG. 2 is a plan view of the invention, with parts removed.

Snow blower 10 has frame members 38 and 40 fixed thereto at the lower rear side of the frame 30, as seen in FIG. 1. Blower 10 also has a C-shaped member 42 fixed thereto at the upper rear side, as seen in FIGS. 1 and 2. C-shaped member 42 has fixed thereon frame members 44 and 46 which are above members 38 and 40. Members 38, 40, 44 and 46 are strong and rugged for carrying blower 10 ahead of tractor 12.

Tractor 12 has a support means or member 48 on the front end and fixed by any suitable means to frame 13. Member 48 includes a rear portion 50, side portions 52 and 54, and a top portion 56. Portion 50 is secured to the front of frame 13 by use of bolts or other means and is secured to the sides of the frame by means of braces 58 and 60. This provides a very sturdy means for supporting the blower 10 from tractor 12. Member 48 is constructed so as to be quickly detachable from tractor frame 13. An additional support member 62 is provided between member 48 and a frame portion 64. Member 62 is fixed to support means 48 and connected to tractor frame 13 near the mid-section of tractor 12. Member 62 and portion 64 provide the additional support, as stated, when the tractor is pushing the blower into snow, and member 62 acts as a strut member for the blower frame from a point well back on the tractor. It is thus seen that a strong and rugged snow blower support is required and is provided by the construction shown and described.

Since the snow blower must be raised and lowered, as stated above, a movable supporting and connecting means must be provided so that the up-and-down operation is easily accomplished and so that the various movable parts do not interfere with the fixed parts. Positioned between and connected to support member 48 and the snow blower frame is a linkage means generally designated as 66. Linkage means 66 includes a pair of upper links or members 68 and 70 and a pair of lower links or members 72 and 74. These links are disclosed as being flat bars but they could be in the shape of an angle or a channel. Links 68 and 70 are pivotally connected to tractor support member portions 52 and 54 at the top thereof by means of a long pin or rod 76, and are pivotally connected to blower frame members 44 and 46 by means of a long pin or rod 78. Links 72 and 74 are pivotally connected to tractor support member portions 52 and 54 at the bottom thereof by means of a long pin or rod 80 and are pivotally connected to blower frame members 38 and 40 by means of a long pin or rod 82.

As seen in FIG. 1, the linkage means 66 comprising upper members 68 and 70 and lower members 72 and 74 is peculiar in that the members are on lines which form two radii of a circle with a pulley or sheave as the center of the circle or the intersecting point of the radius lines.

This construction forms the basis of the drive mechanism to be described.

The means for raising and lowering the snow blower is done by the use of a rod member 84 which is pivotally connected to pin 82, and which extends rearwardly to a point on the frame near the center of the tractor. At this point, tractor frame 13 has a lug 86 fixed thereon with a handle or lever 88 pivotally connected to the rear end of rod 84, and connected to lug 86 by means of a pin 90, the pin forming the fulcrum of lever 88. A pin 92 is used at the intersection of lever 88 and rod 84 for the pivotal connection. Thus, it is seen that as lever 88 is manually pushed forward, the snow blower is lowered and as lever 88 is pulled to the rear, the blower is raised. An assisting means is required, in addition to lever 88 and rod 84, to raise and lower the blower attachment.

A pair of springs 94 and 96 is disposed between the tractor and the snow blower for this purpose. These springs are selected and positioned so as to maintain a favorable balancing of the weight of the blower to assist the operator in raising and lowering the snow blower. The lower ends 98 and 99 of the springs are pivotally connected to rod 82 and the upper ends 100 and 101 of the springs are positioned to engage with portion 56 of member 48. The upper ends 100 and 101 of the springs are formed to extend in the shape of cranks 102 and 103. The cranks are used to adjust the tension of the springs, the top portion 56 of member 48 defining openings of sufficient size to allow the upper ends 100 and 101 to move a small amount when the blower is raised and lowered.

The drive mechanism for the blower 34 and the auger 32 of the attachment is disposed alongside the front end of the tractor. A support element or arm 104 is fixed to the blower frame 30 and the arm has an upstanding portion 106 and a longitudinally extending portion 108. Portion 108 has a forward extension or bracket 110 and a rear extension or bracket 112. A shaft 114 is journaled in brackets 110 and 112 and extends a short distance on either side of the brackets. A rotatable means in the form of a first driven sheave or pulley 116 is fixed on shaft 114 near the rear end thereof and a second driving sheave or pulley 118 is fixed on shaft 114 near the forward end. Blower 34 has a shaft 120 journaled thereon which shaft extends through the rear portion of the blower enclosure and which has a second driven sheave or pulley 122 aligned with pulley 118. An idler wheel 124 is journaled on a shaft 126 which shaft is supported from an arm 128 connected to the forward extension 110 of arm 104.

A belt 128 connects and engages with pulley 21 on shaft 18 of the tractor engine 16 and with driven pulley 116 and a belt 130 connects and engages with pulley 118, idler 124 and pulley 122 for driving the blower. Shaft 120 also has a sprocket 132 fixed thereon which is disposed between pulley 122 and blower 34. Aligned with sprocket 132 and supported from frame 30 is a sprocket 134 on a shaft 136. A bevel gear 138 is fixed on the opposite end of shaft 136 from sprocket 134. At one end of a shaft 137 and engaging with gear 138 is a mating bevel gear 146, and on the other end of shaft 137 is a sprocket 139. Bevel gears 138 and 146 may be suitably enclosed in a conventional gear box for proper lubrication. Conventional chains 143 and 145 are used to drive sprockets 134 and 141 for rotating auger 32. Auger 32 is supported from blower frame 30 by means of a shaft 140 journaled in bearings 142 and 144, shaft 140 having at one end the sprocket 141. The drive mechanism from pulley 122 to the blower and the auger is conventional and need not be further described.

The drive mechanism from pulley 21 on shaft 18 to pulley 122 on shaft 120 is constructed and arranged such that when the snow blower attachment is raised and lowered, the forward end of support arm 104 also moves up and down with the attachment while the rear portion of the support arm remains close to one position, and it approaches, but does not fully achive, the condition diagrammatically shown in FIGS. 3 and 4. No universal joints or splined shafts are required in the drive mechanism.

When the blower is lowered, the inherent flexibility of drive belt 128 allows a slight tilting of the top of pulley 116 in the forward or counter-clockwise direction, and when the blower is raised, belt 128 allows a slight tilting of the top of pulley 116 in a rearward or clockwise direction, as seen in FIG. 4.

The positioning and construction of the linkage means 66 is such that the snow blower is displaced in a curvilinear direction or an arc as it is raised and lowered. The point of convergence of the planes on which the upper links 68 and 70 and of lower links 72 and 74 lie, is at the driven pulley 116. Thus, as shown in FIG. 1, it is seen that pulley 116 is disposed at the center of the curvilinear or circular path taken by the attachment when it commences being raised and lowered from the position shown. Pulley 116, on the rear end of support member 104, thus remains close to the same plane or position during the raising and lowering of the attachment, and it tilts in a fore-and-aft direction as the attachment is lowered and raised.

The portion of the drive mechanism from the engine to pulley 118 normally turns whenever the engine is running. When it is desired to operate the auger and blower, idler wheel 124 is moved so as to engage with and tighten belt 130 on pulley 118 and pulley 122.

This is done by the use of a lever 148 disposed above support arm 104 and accessible to the operator. A lever support 150 is fastened to arm 104 and extends rearwardly and upwardly from a bracket 152 on arm 104. Pivoted on bracket 152 is a link 154 to which lever 148 is attached. Also attached to link 154 is a rod 156 which extends to an arm 158 on shaft 126.

When lever 148 is moved forward, link 154 pivots on bracket 152 in a downwardly direction and pushes rod 156 transverse to shaft 114 which moves idler wheel 124 into engagement with drive belt 130 for driving pulley 122 and, in turn, the blower and the auger.

A modification of the linkage and support means is shown in FIG. 5. The linkage means, generally designated as 160, and comprising upper members 162 and 164 and lower members 166 and 168, is peculiar in that the upper and lower members are of unequal lengths, the lower ones being of greater length than the upper ones, for a purpose to be described. The support member 170 for the modified linkage includes a rear portion 172, side portions 174 and 176 and a top portion 178. The modified linkage means is of similar construction and performs substantially the same as does the preferred embodiment, and also may be used for attachments other than snow blowers.

As seen in FIG. 3 the M or middle position of the support arm 114 and the M or middle position of the upper and lower links show that pulley 116 is substantially the center of the curvilinear path taken by these members when the attachment is in the position shown. This is essentially the construction shown in FIG. 5, which shows the unequal linkage construction. The lower links are longer and are inclined at a greater angle than the upper ones with respect to the tractor support member. The preferred embodiment, as seen in FIG. 1, is constructed so that the planes of the upper links and of the lower links meet or intersect at pulley 116, this being the theoretical center of a circle about which the attachment commences its up-and-down movement. The modification allows a slight variation in the curvilinear path so that the planes of the upper and lower links intersect at a point in the region near pulley 116, depending upon the position of the attachment. The driving means or belt 128 which connects pulley 21 and pulley 116 is sufficiently strong and flexible to withstand the slight misalignment when pulley 116 moves about in a limited area.

It is thus seen that herein described is a simple, efficient and economical drive mechanism for a snow blower which is mounted on the front of tractor and which utilizes the driving shaft forward of the engine.

It is to be understood that the embodiments disclosed are intended to be illustrative only, that modifications, other than those shown and described, will occur to those skilled in the art, and that the disclosure is not to be taken as limited except as defined in the annexed claims.

What is claimed as new and desired to be secured by Letters Patent of the United States is:

1. A drive mechanism for an attachment to a tractor having a driving sheave, said attachment having a frame, means included in said attachment for moving material, a first driving sheave included in said attachment and being operatively connected to said material moving means for driving said material moving means, a support arm included in said attachment and being directed upwardly and rearwardly with respect to the fore-and-aft axis of said tractor, a shaft included in said attachment and being rotatably supported from said support arm and disposed parallel to and along one side of said tractor axis, a driven sheave fixed on the rear end of said shaft and being drivingly aligned with said tractor driving sheave, means connected with said tractor driving sheave and with said driven sheave for rotating said shaft, a second driving sheave fixed on the front end of said shaft and being drivingly aligned with said first driving sheave, means connected between both said driving sheaves of said attachment for driving said material moving means, an upper control link means and a lower control link means both pivotally connected to both said tractor and said attachment and pivotally mounting said attachment on said tractor and being disposed with the longitudinal axes of said link means converged on an axis extending through said driven sheave in one position of pivot of said attachment on said tractor.

2. In a drive mechanism for an attachment on a tractor, said attachment being constructed to move in an up-and-down direction relative to said tractor and said tractor having a driving sheave for driving said attachment; the combination of a support member on said tractor and a second support member on said attachment, a plurality of springs connected to said tractor support member and to said attachment support member in position to exert an upward force on said second support member, support means connected to said tractor and to said attachment support member including a lever for raising and lowering said attachment, a support arm on said attachment extending rearwardly therefrom, a driven sheave on said support arm and drivingly aligned with said tractor driving sheave, means connected to said driven sheave for driving said attachment, a plurality of upper links and a plurality of lower links pivotally connected to said tractor support member and to said second support member, one position of said upper links and said lower links disposed to have their longitudinal axes converge on an axis extending through said driven sheave and transverse to the fore-and-aft axis of said tractor, said one position of said upper and lower links being located so that said springs and said support means, including said lever, raise and lower said attachment in a curvilinear path initially generated about said transverse axis through said driven sheave.

References Cited

UNITED STATES PATENTS

| | | | |
|---|---|---|---|
| 2,645,890 | 7/1953 | Spedding | 56—25 |
| 2,974,735 | 3/1961 | Smith et al. | 172—79 XR |
| 3,187,821 | 6/1965 | Kamlukin | 37—43 XR |

ANTONIO F. GUIDA, *Primary Examiner.*

JAMES W. PETERSON, *Assistant Examiner.*